(12) United States Patent
Li

(10) Patent No.: US 7,661,138 B1
(45) Date of Patent: Feb. 9, 2010

(54) FINITE STATE AUTOMATON COMPRESSION

(75) Inventor: Xianzhi Li, San Jose, CA (US)

(73) Assignee: Jupiter Networks, Inc., Sunnyvale, CA (US)

(*) Notice: Subject to any disclaimer, the term of this patent is extended or adjusted under 35 U.S.C. 154(b) by 792 days.

(21) Appl. No.: 11/214,896

(22) Filed: Aug. 31, 2005

(51) Int. Cl.
*G06F 11/00* (2006.01)
(52) U.S. Cl. ...................................... 726/23
(58) Field of Classification Search ............. 726/22–24; 713/164, 188; 714/819; 707/101
See application file for complete search history.

(56) References Cited

U.S. PATENT DOCUMENTS

| | | | |
|---|---|---|---|
| 7,305,383 B1* | 12/2007 | Kubesh et al. ............... | 707/3 |
| 2004/0083387 A1 | 4/2004 | Dapp et al. | |
| 2005/0035784 A1* | 2/2005 | Gould et al. ................ | 326/46 |
| 2005/0278400 A1* | 12/2005 | Kang et al. ................. | 708/203 |
| 2006/0218161 A1* | 9/2006 | Zhang et al. ................ | 707/100 |
| 2008/0140662 A1* | 6/2008 | Pandya ....................... | 707/6 |

OTHER PUBLICATIONS

Kiraz, G. A.: "Compressed Storage of Sparse Finite-State Transducers"; Lecture Notes in Computer Science, vol. 2214/2001, Jan. 2001, pp. 109-121.

* cited by examiner

*Primary Examiner*—Beemnet W Dada
(74) *Attorney, Agent, or Firm*—Harrity & Harrity, LLP

(57) ABSTRACT

A system and method for intrusion detection and prevention processing are described. One or more states of a finite state automaton (FSA) stored in a memory may be compressed to form compressed state information. The FSA may include a set of states and defined state transitions for input characters. The compressed state information may include individual entries for the characters having a corresponding state transition to a next state, and a single entry for the values having a corresponding state transition to a common state. Context data may be searched using the compressed state information.

25 Claims, 8 Drawing Sheets

|  | ASCII CHARACTER |||||||||||
| --- | --- | --- | --- | --- | --- | --- | --- | --- | --- | --- | --- |
|  | "NUL" | ... | "CR" | ... | 8 | 9 | ... | e | f | ... | (FF) |
| STATE 1 | 1 | 1 | 1 | 1 | 1 | 2 | 1 | 1 | 1 | 1 | 1 |
| STATE 2 | 1 | 1 | 1 | 1 | 3 | 1 | 1 | 1 | 1 | 1 | 1 |
| STATE 3 | 1 | 1 | control information | 1 | 1 | 1 | 1 | 1 | 1 | 1 | 1 |

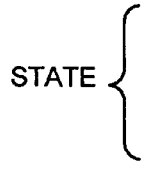
FIG. 6A
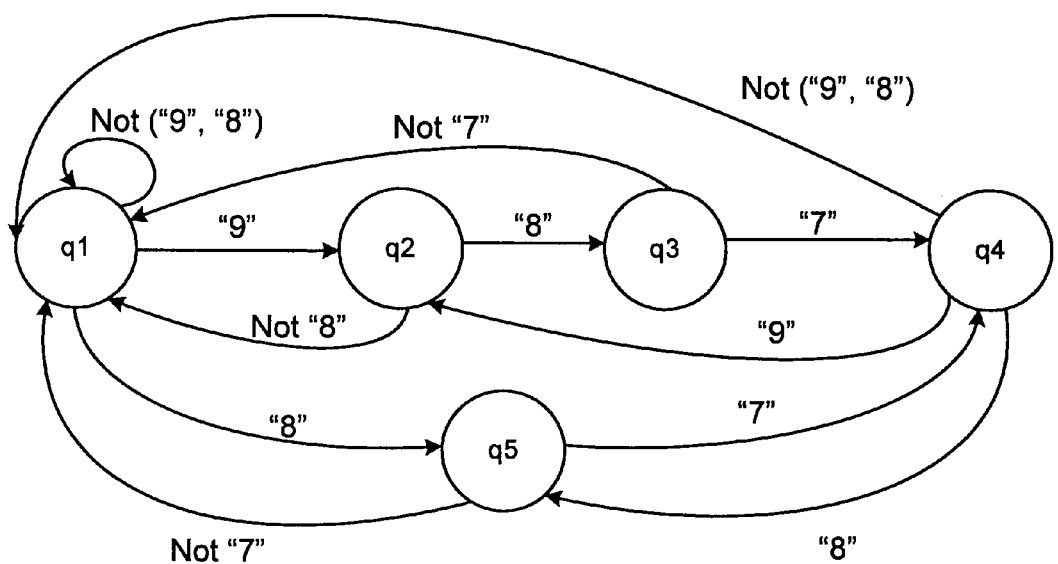
FIG. 6B
| ENTRY | 0 | 1 | 2 |
|---|---|---|---|
| CONTENTS (HEX) | 38000005 | 39000002 | FF000001 |
FIG. 6C

| ENTRY | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| CONTENTS (HEX) | 2107 | 2204 | 2302 | 2408 | 2503 | 2609 | 2705 | 2810 | 290B | 2A0F | 2B0A | 2C11 | 2D06 | 2E0E | 2F0D | FF65 |

| ENTRY | 0 | 1 | 2 |
|---|---|---|---|
| CONTENTS (HEX) | 300C | 3112 | FF01 |

FINITE STATE AUTOMATON COMPRESSION

FIELD OF THE INVENTION

Implementations consistent with the principles of the invention relate generally to network security and, more particularly, to systems and methods for attack signature analysis.

BACKGROUND OF THE INVENTION

Networked computing resources encounter potentially compromising attacks conveyed by network traffic. To combat such attacks, purpose-built hardware and software have been developed to implement intrusion detection and prevention (IDP) systems. IDP processing includes signature-based methods designed to inspect network activity and implement attack signature detection techniques which identify data patterns of known attacks. Attack signature detection uses signature analysis which involves the interpretation of a series of data packets using character strings that are previously determined to represent a known attack pattern.

Signature analysis may be accomplished by searching selected packet payloads using finite state machines or finite state automata (FSA) for signatures corresponding to specific known attacks. FSA state tables are typically stored in external memory such as dynamic random access memory (DRAM). Accessing and fetching the FSA state tables from the DRAM during IDP processing can be a primary factor in determining IDP processing throughput, which affects overall IDP system performance, particularly when large signature files or databases are involved and/or high-load monitoring (e.g., high date transfer rates and traffic volumes) is required.

Existing techniques for improving IDP memory read performance have been limited to using more powerful hardware, such as faster central processing units (CPUs). It would be desirable to more efficiently improve IDP memory read performance.

SUMMARY OF THE INVENTION

According to one aspect, a method may include compressing state information of a finite state automaton (FSA) stored in a memory, the state information including a set of states that define state transitions for input characters, The method may also include storing the compressed state information, the compressed state information including individual entries for the input characters which correspond with state transitions to a next state, and a single entry for two or more characters that correspond with state transitions to a common state. Additionally, the method may include searching context data corresponding to a possible network attack using the compressed state information According to another aspect, an intrusion detection system may include a memory to store a finite state automaton (FSA) including a set of states and defined state transitions for input characters. The system may also include logic to compress state information of a designated state of the set to form compressed state information including: individual entries for the input characters that correspond with state transitions from the designated state to a next state, and a single entry for characters that correspond to a state transition from the designated state to a common state. Additionally, the system may include a search engine to search context data corresponding to a possible network attack using the compressed state information.

According to yet another aspect, a system may include means for compressing state information of a finite state automaton state table. The system may also include means for storing the compressed state information as content addressable memory, the state information including a set of states that relate to a set of values, and the compressed state information including individual entries for the values having a corresponding state transition to a non-spin state, and includes a single entry for the values having a corresponding state transition to a common state. Additionally, the system may include means for searching context data using the compressed state information.

BRIEF DESCRIPTION OF THE DRAWINGS

The accompanying drawings, which are incorporated in and constitute a part of this specification, illustrate an implementation of the invention and, together with the description, explain the invention. In the drawings.

FIG. 6A illustrates an exemplary partial DFA state table associated with two attack signatures for which methods and systems consistent with the principles of the invention can be implemented;

FIG. 6B illustrates an exemplary state transition diagram corresponding to the DFA state table of FIG. 6A;

FIG. 6C illustrates compressed state information for a state defined in the DFA state table of FIG. 6A;

FIG. 7C illustrates compressed state information for a state defined in the DFA state table of FIG. 7A.

DETAILED DESCRIPTION

The following detailed description of embodiments of the principles of the invention refers to the accompanying drawings. The same reference numbers in different drawings may identify the same or similar elements. Also, the following detailed description does not limit the invention. Instead, the scope of the invention is defined by the appended claims and equivalents.

Systems and methods consistent with the principles of the invention may provide IDP processing that includes accelerated finite state automaton (FSA) searching that capitalizes on certain state transition characteristics exhibited by regular expression patterns used to represent known attacks. In one exemplary implementation, increased rates of fetching state information from memory are achieved by selectively compressing the state information. In another exemplary implementation, increased rates of fetching state information from memory are achieved by selectively caching the state information in a locked buffer.

Exemplary Network Configuration

Figure 1:
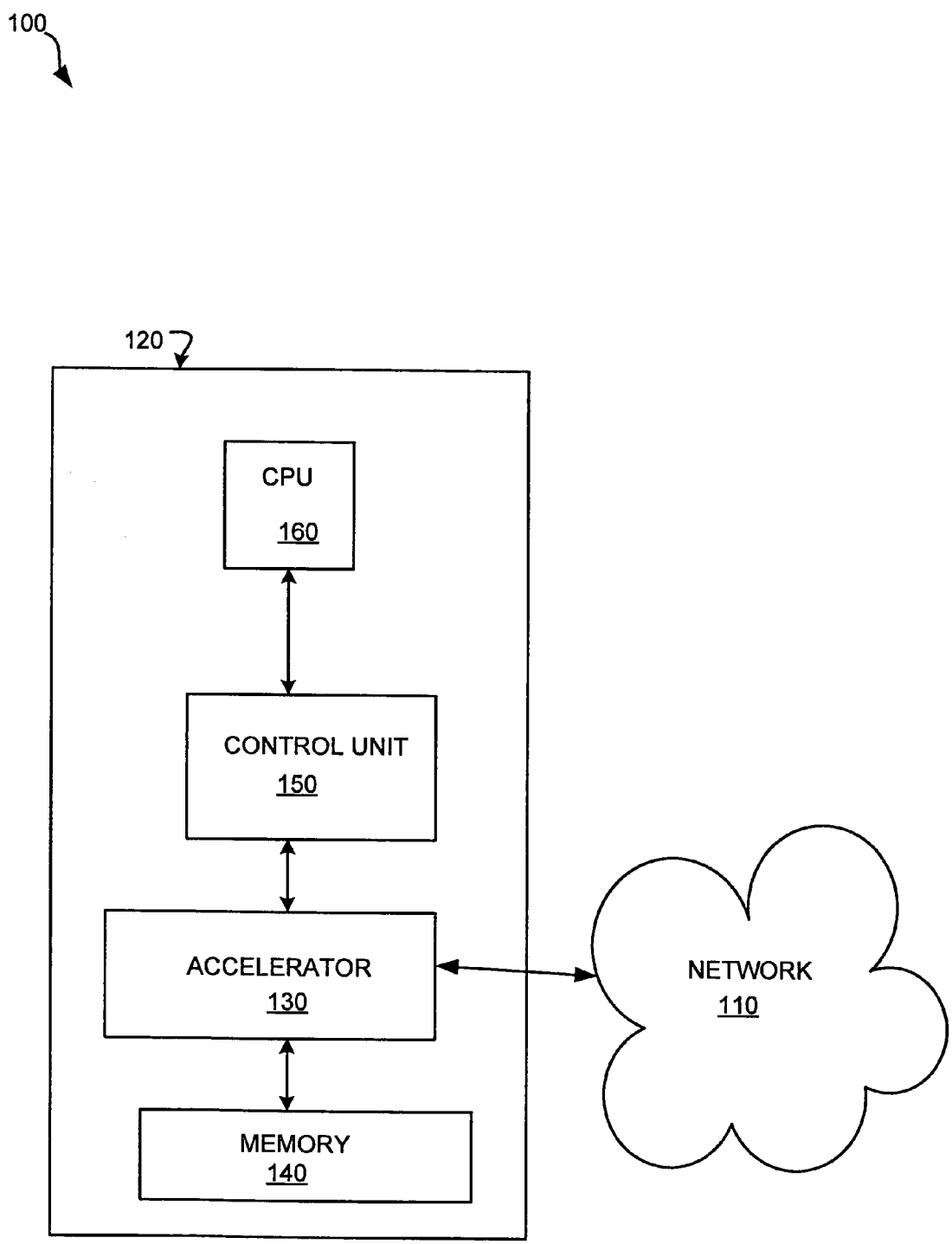
FIG. 1 is an exemplary diagram illustrating an exemplary network in which methods and systems consistent with the principles of the invention can be implemented.

FIG. 1 illustrates a communications network 100 in which systems and methods consistent with the principles of the invention may be implemented. As illustrated, communications network 100 may include a network 110 that may operatively communicate with host 120. Host 120 may include an accelerator 130, a memory 140, a control unit 150, and a central processing unit (CPU) 160 interconnected, as shown, via a bus or another type of connection.

In one implementation, host 120 may be linked to network 110, as shown, via any well-known technique, such as wired, wireless, and/or optical communication links. The links may include, for example, a broadband connection, such as a digital subscriber line (DSL) connection provided over, for example, shielded twisted pair, a cable modem connection provided over, for example, coaxial cable and/or optical fiber, and/or a wireless connection provided over, for example, a wireless fidelity (Wi-Fi) link and/or free-space link.

The number and type of devices illustrated in FIG. 1 are provided for simplicity. In practice, a typical network in which the invention may be implemented could include more or fewer networks and/or devices that aid in receiving, processing, and/or transmitting data, than what is illustrated in FIG. 1. In addition, devices depicted as single entities may be implemented in a distributed arrangement. Further, in some implementations, functions described as being performed by two or more devices may be performed by a single device.

In one implementation, network 110 may include one or more networks, such as a local area network (LAN), a wide area network (WAN), a public switched telephone network (PSTN), a dial access network (DAN), an intranet, the Internet, or a combination of similar or dissimilar networks.

Host 120 may include one or more devices, such as a personal computer, a laptop, a personal digital assistant (PDA), or another type of computation or communication device capable of initiating, processing, transmitting, and/or receiving data (e.g., data packets) and/or voice communications or other media.

Accelerator 130 may include one or more devices, such as a field-programmable gate array (FPGA), an application-specific integrated circuit (ASIC), or another type of programmable logic chip capable of initiating, processing, transmitting, and/or receiving data via a network device (not shown), such as a router, a modem, a gateway, an interface, and the like. Memory 140 may include one or more devices, such as a random access memory (RAM), a dynamic RAM (DRAM), a synchronous DRAM (SDRAM), or another type of storage device capable of storing, processing, transmitting, and/or receiving data, such as an FSA table, instructions, and other information. Control unit 150 and/or CPU 160 may include one or more devices, such as a processor, system controller, a microprocessor, or another type of processing logic capable of performing logical operations, and/or retrieving, decoding, and executing instructions.

In communications network 100 exemplified in FIG. 1, data packets may be communicated between network 110 and host 120 via accelerator 130. The data packets may be forwarded to CPU 160 via control unit 150. CPU 160 may digest information from and/or about the packet payloads to form context data (character strings) and transmit the context data to accelerator 130 via control unit 150 for IDP processing, which is explained in more detail below. In performing the IDP processing, accelerator 130 may access FSA state information (e.g., tables) stored in memory 140. Accelerator 130 may communicate the results of the IDP processing to processor 160 via control unit 150. In one implementation, accelerator 130 may form context data from the packet payloads for IDP processing.

Figure 2:
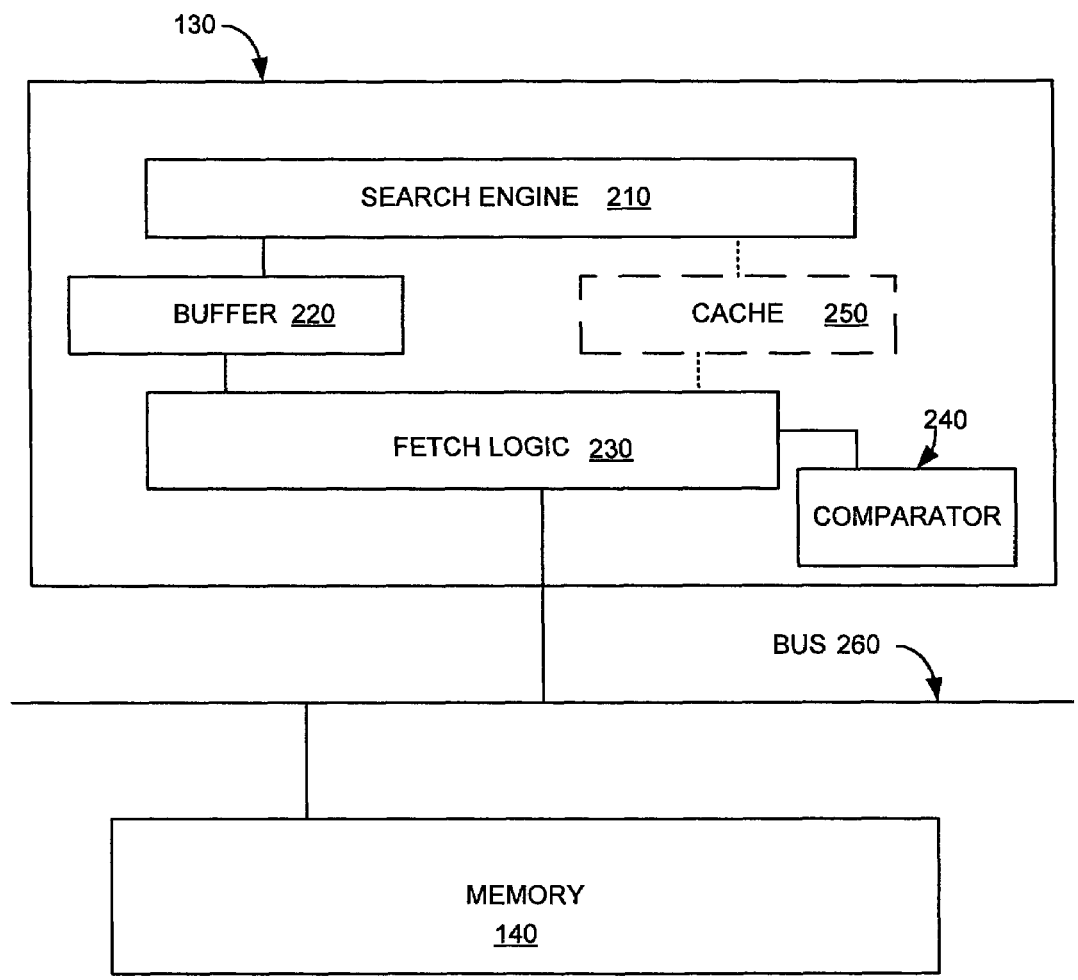
FIG. 2 is an exemplary block diagram of the accelerator of FIG. 1 according to an implementation consistent with the principles of the invention.

FIG. 2 illustrates an exemplary configuration of accelerator 130 in an implementation consistent with the principles of the invention. Other configurations may alternatively be used. As illustrated, accelerator 130 may include a search engine 210, a buffer 220, fetch logic 230, a comparator 240, a cache 250, and a bus 260 that permits communication among the components of accelerator 130 and memory 140.

Search engine 210 may include one or more devices, such as a processor, a microprocessor, an FPGA processing logic, or any other type of execution unit capable of searching character strings extracted from network data in association with state information from a finite state machine or FSA associated with IDP processing.

Buffer 220 may include one or more devices, such as a register, or any other type of lockable storage capable of buffering state information to be accessed by search engine 210. In one implementation, buffer 220 may have a storage capacity of 512 bytes.

Fetch logic 230 may include one or more devices, such as a processor, a microprocessor, processing logic, or any other type of execution unit capable of fetching state information from memory 140 and providing the state information to buffer 220 and/or cache 250.

Comparator 240 and cache 250 may include one or more devices, such as a RAM, or any other type of high-speed storage capable of caching state information, instructions and/or other data. In one implementation, comparator 240 may be capable of supporting hashing comparator functions. In one implementation, cache 250 may have a storage capacity of 512 bytes that may be configured, for example, as 32 cache lines, 16 bytes per cache line.

Exemplary Processing

Finite automata (FA), including a set of states and defined state transitions associated with one or more regular expressions that represent one or more specific attack signatures, may be stored in memory 140. The FA may be deterministic FA (DFA) and/or non-deterministic FA (NFA). In one implementation, the NFA is converted and stored as DFA in memory 140. For purposes of explaining implementations consistent with principles of the invention, only DFA will be discussed.

In one implementation, the DFA may be stored as a state table. The attack signatures may be data value sequences represented by character strings, for example, including any of the set of extended ASCII characters. Accordingly, the state table may be represented as a matrix in which each row represents a state that corresponds to a sequence of two or more ASCII characters. The state table may have any number of states (q), and any number of characters, e.g., the extended ASCII character set of 256. State information including state transition information and other control information may be indicated for each state/character entry in the table. A state table may include state information related to any number of attack signatures. The control information included in the entry may indicate whether a match occurs and specify the matched signature. When a match occurs, for example, the control information may include instructions for search engine 210 to either discontinue searching the context data or to continue searching for additional attacks where the state table includes more than one attack signature. The control information may include instructions for search engine 210 to discontinue searching the context data whether a match occurs or not, for example, when a predetermined limit associated with IDP processing is exceeded (e.g., thereby approximating a denial-of-service attack).

One particular type of state that is included in the state table is referred to herein as a "spin state." In one implementation, a spin state may include a state in which the finite state machine (FSM) begins searching the context data, i.e., before a first character of a signature is located in a search string, e.g., an initial state. In another implementation, a spin state may include any state in which an intrastate transition occurs (i.e., no state transition occurs) for one or more characters of the ASCII code set. In another implementation, a spin state may include a state which is statistically the most frequented by the FSM. In another implementation, a spin state may include a state to which other states transition for one or more entries (i.e., the FSM returns to or "homes" on the spin state). A spin state may have any one or more of these or other characteristics. The spin state may be referred to as a spin row. An FA state table may have one or more spin rows. Other rows may be refereed to as non-spin rows.

Figure 3:
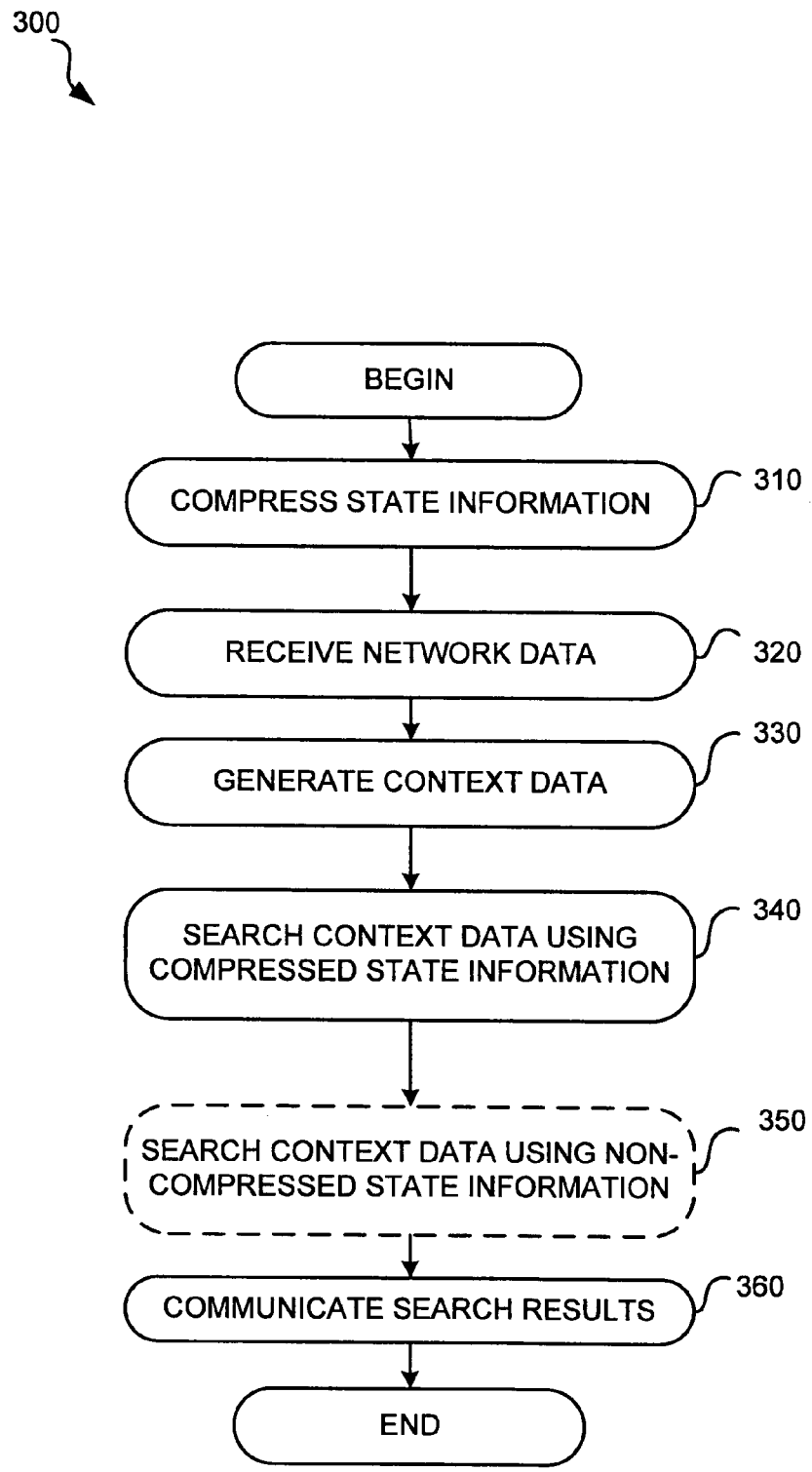
FIGS. 3 and 4 are exemplary flow diagrams illustrating methods for providing IDP processing consistent with the principles of the invention.

FIG. 3 is a flowchart of exemplary processing 300 for accelerating intrusion detection and prevention (IDP) processing of network data, according to an implementation consistent with principles of the invention. Processing may begin by compressing state information of one or more DFA tables stored in memory 140 (operation 310). In one implementation, compressing the state information may include reducing the number of entries in the DFA table by, for example, grouping entries that have common state transitions. For example, the amount of memory needed to store any one or more FA rows may be reduced by including individual entries only for row entries having next state information that is any state other than the spin row, and one (or more) entry for all the other entries that transition to the spin row. As shown in FIGS. 6A and 6C, for example, a spin row having 2 (of 256) entries that transition to a next state, and 254 (of 256) entries that remain in the spin row (FIG. 6A), may be compressed to state information having a total of 3 entries, i.e., the former 2 plus one for the latter (FIG. 6C). The compressed state information may be stored in memory 140 or any other memory. In one implementation, the compressed state information may be stored as content-addressable memory.

Host 120 may receive data packets from network 110, for example, via accelerator 130 (operation 320). In one implementation, the received data packets may be forwarded to CPU 160 via control unit 150. CPU 160 may generate context data from and/or about the packet payload (operation 330). In another implementation, the accelerator 130 may generate context data from and/or about the packet payload received data packets.

The context data may be received by accelerator 130 via control unit 150. Search engine 210 may search the context data, for example, beginning with the first character of the context data by creating an index. Search engine 210 may compare the characters of the context data with the compressed state information, for example, using a hashing comparator supported by cache 240 (operation 340). Search engine 210 may directly access the non-compressed DFA table stored in memory 140, as appropriate (operation 350). The results of the search may be communicated to CPU 160 via control unit 150 (operation 360).

Figure 4:
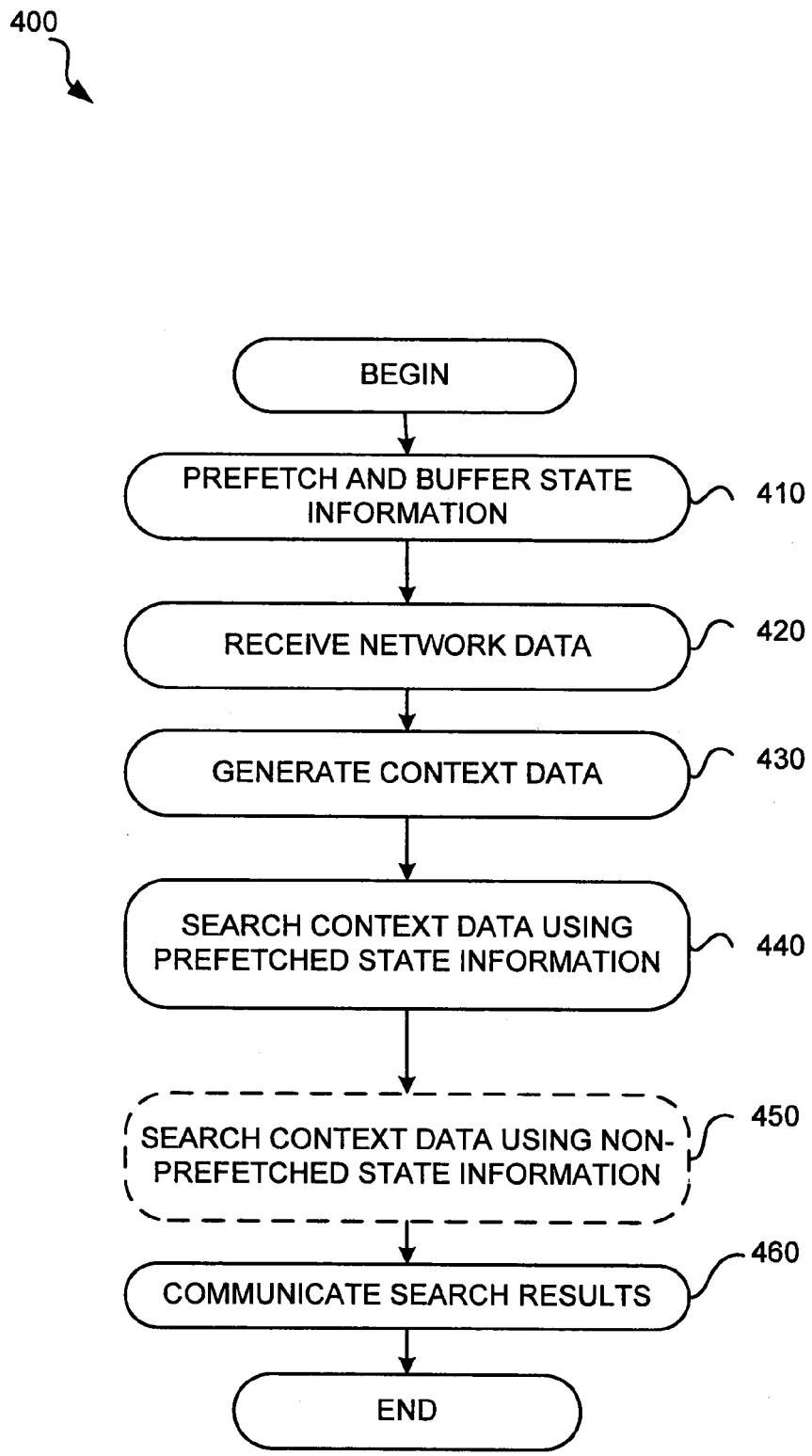

FIG. 4 is a flowchart of exemplary processing 400 for accelerating IDP processing of network data, according to another implementation consistent with principles of the invention. Processing may begin with fetch logic 230 fetching state information from the DFA table stored in memory 140 at a point before the state information is actually needed, i.e., prefetching. For example, fetch logic 230 may prefetch spin state information associated with one or more signatures, and store the prefetched state information in buffer 220. In one implementation, the prefetched state information may be lockingly stored in buffer 220 (operation 410) so that the prefetched state information is saved and may not be modified or rewritten such that the prefetched state information may be accessed over and over again. In one implementation, the prefetched state information may have a data size that is equivalent to the data storage capacity of buffer 220.

Host 120 may receive data packets from network 110, for example, via accelerator 130 (operation 420). In one implementation, the data packets may be forwarded to CPU 160 via control unit 150. CPU 160 may generate context data from and/or about the packet payload (operation 430). In another implementation, the accelerator 130 may generate context data from and/or about the packet payload received data packets.

The context data may be received by accelerator 130 via control unit 150. Search engine 210 may search the context data, for example, beginning with the first character of the context data by creating an index. Search engine 210 may search the characters of the context data with the prefetched state information stored in buffer 220 (operation 440). Search engine 210 may search the characters of the context data with non-buffered (non-spin) state information by accessing the DFA table stored in memory 140, as appropriate (operation 450) when a state transition occurs to a next state based on the searching using the spin state information. Search engine 210 may again search the characters of the context data with the prefetched state information stored in buffer 220 when a state transition occurs to the spin state based on the searching using the non-buffered state information (i.e., a character in the search string distinguishes the search string from the attack signature). The IDP processing may continue until the context data is searched, resulting in no match or one or more matches. The results of the search may be communicated to CPU 160 via control unit 150 (operation 460).

According to another implementation, fetch logic 230 may prefetch non-spin state information which may be stored in cache 250. Search engine 210 may search the characters of the context data with non-spin state information by accessing the cache 250, as appropriate, when a state transition occurs to a next state based on the searching using the spin state information.

According to another implementation, the state information may be compressed substantially as described above, and then prefetched and stored in buffer 220, substantially as described above.

Examples

Figures 5A, 5B:
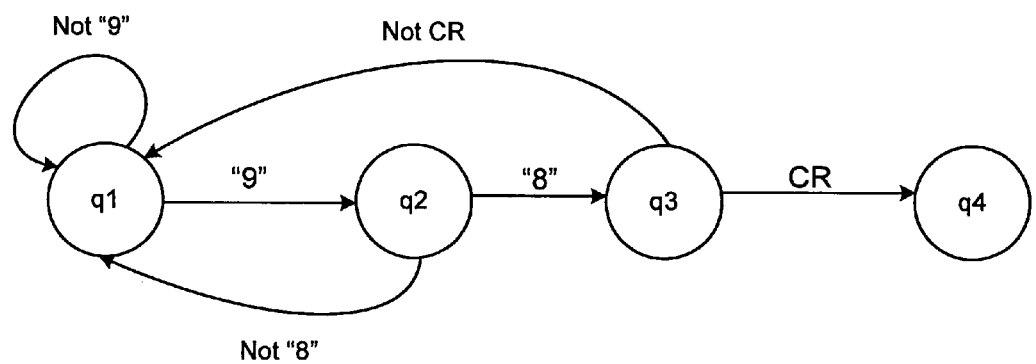
FIG. 5A illustrates an exemplary partial DFA state table associated with one attack signature for which methods and systems consistent with the principles of the invention can be implemented.
FIG. 5B illustrates an exemplary state transition diagram corresponding to the DFA state table of FIG. 5A.

FIG. 5A is illustrative of an exemplary DFA transition table associated with an attack signature represented by keywords that are abstracted into a pattern or regular expression in which the character sequence "98CR" may follow any preceding characters, where "CR" designates a special character (ASCII code, 0xD (i.e., "carriage return")). FIG. 5B illustrates a state transition diagram that corresponds to the transition table of FIG. 5A.

Each row (state) in the DFA table illustrated in FIG. 5A may include 256 columns, each corresponding to a value in the extended ASCII character set. Each table entry may include defined state (row) transitions and additional control information. The defined state transitions indicate a next state for advancing or transitioning in FSM operation procession. The state transitions and any control information may be stored or identified as any binary amount of data, e.g., four bits, one byte, twelve bits, two bytes, or more, sufficient to include the total number (n) of states in the DFA table. In FIG. 5A, the state transitions and the control information are represented in decimal format (e.g., 1, 2, . . . , n) and may be stored as two bytes of binary information (e.g., 00000000 00000001, etc.). Thus, each row in the table (e.g., 1, 2, 3, . . . , n) includes 512 bytes of data. It should be appreciated that a DFA table may include entries corresponding to multiple attack signatures (e.g., FIG. 6A).

In FIG. 5A, row "1" may be considered a spin row because, for example, searching initiates in state "1" and also because most of the entries transition to state "1". According to one implementation consistent with the principles of the invention, fetch logic 230 may prefetch the 512 byte spin row from memory 140, and lockingly store the spin row portion of the DFA table in buffer 220, which may have a storage capacity of 512 bytes. The balance of the DFA table, i.e., the non-spin rows (2, 3, . . . , n) may remain stored in memory 140. Host 120 may receive data packets from network 110. Accelerator 130 may forward the received data packets to CPU 160 via control unit 150. CPU 160 may generate context data from the selective packet payloads, and forward the context data to accelerator 130 via control unit 150 for IDP processing.

Search engine 210 may search the context data (search string) using the information contained in the buffered spin row. As search engine 210 successively encounters ASCII characters in the search string whose next state transition is to (remain in) row "1", only the buffered spin row information is accessed. However, when a state transition to row 2 occurs during the search (e.g., as shown in FIG. 5A, receipt of a "9" character indicates a transition to state (row) 2), search engine 210 may access subsequent state transitions and control information by fetch logic 230 the next state or a portion thereof from the DFA table from memory 140 via bus 260. In FIG. 5A, if the next character in the search string is anything other than an "8," the state transitions back to state 1, and search engine 210 searches the next sequential character in the search string using the buffered spin-row state information. However, if an "8" follows the "9" in the search string, search engine 210 may access next state transition and control information by fetch logic 230 fetching the next state or a portion thereof from the DFA table stored in memory 140. If anything other than value, CR, follows the "8," i.e., a state transition to state 1, search engine 210 may search the next sequential character in the context data using the buffered spin-row state information. However, if the value, CR, follows the "8," then a match is identified and the appropriate IDP operations subsequently may be implemented. For example, control information included in state entry, [3,CR], may include instructions for search engine 210 to discontinue searching. Search engine 210 may then communicate the search result to CPU 160. Alternatively, if the state table includes additional attack signatures, the control information in state entry, [3,CR], may include instructions for search engine 210 to continue searching for the additional attack signatures.

FIG. 6A is illustrative of an exemplary DFA transition table associated with two attack signatures represented by keywords that are abstracted into respective regular expressions, "98" and "87". As with the DFA table shown in FIG. 5A, row "1" may be considered a spin row. FIG. 6B illustrates a state transition diagram that corresponds to the transition table of FIG. 6A.

Each entry in the spin row includes contents of defined state transitions which indicate a next state for transitioning. The state transitions may be stored as any binary amount of data, e.g., four bits, one byte, twelve bits, two bytes, or more, sufficient to include the total number (n) of states in the DFA table. In FIG. 6A, the state transitions are represented in decimal format (e.g., 1, 2, . . . , n) and may be stored as two bytes of binary information (e.g., 00000000 00000001, etc.). Thus, the spin row in the table may include 512 bytes of data.

FIG. 6C illustrates the spin row of the DFA table shown in FIG. 6A, as compressed state information and stored in memory 140, according to one implementation consistent with the principles of the invention. As shown, the 256 entries (e.g., 512 bytes) of the spin row have been compressed to three entries (0-2) of state information shown in hex format. That is, the spin row is compressed to state information including a first entry (0) for the state transition to state 5 for character "8" (38, in hex), a second entry (1) for the state transition to state 2 for character "9" (39, in hex), and single entry (3) for the "other" 254 spin row entries for which the next state transition indicates that the state remains the same (i.e., state 1), which may be designated as the unassigned value, "FF" (in hex), in the extended ASCII character set.

Each of the entries in the compressed state information for the spin row may contain 4 bytes of data, for example, shown as hex. The first byte may denote the character (e.g., 38, in hex), the next byte may contain control information (e.g., 00), and the final two bytes may denote the next state transition (e.g., 0005). Thus, the compressed state information may include a total of 12 bytes of data (three entries, four bytes per entry). Accordingly, the compressed state information for the spin row may be stored in memory 140 or buffered in buffer 220 as compressed from 512 bytes to 12 bytes. Buffer 220 and/or cache 240 may support a comparator for comparing each entry in parallel including individual entries and the FF entry.

Figures 7A, 7B:
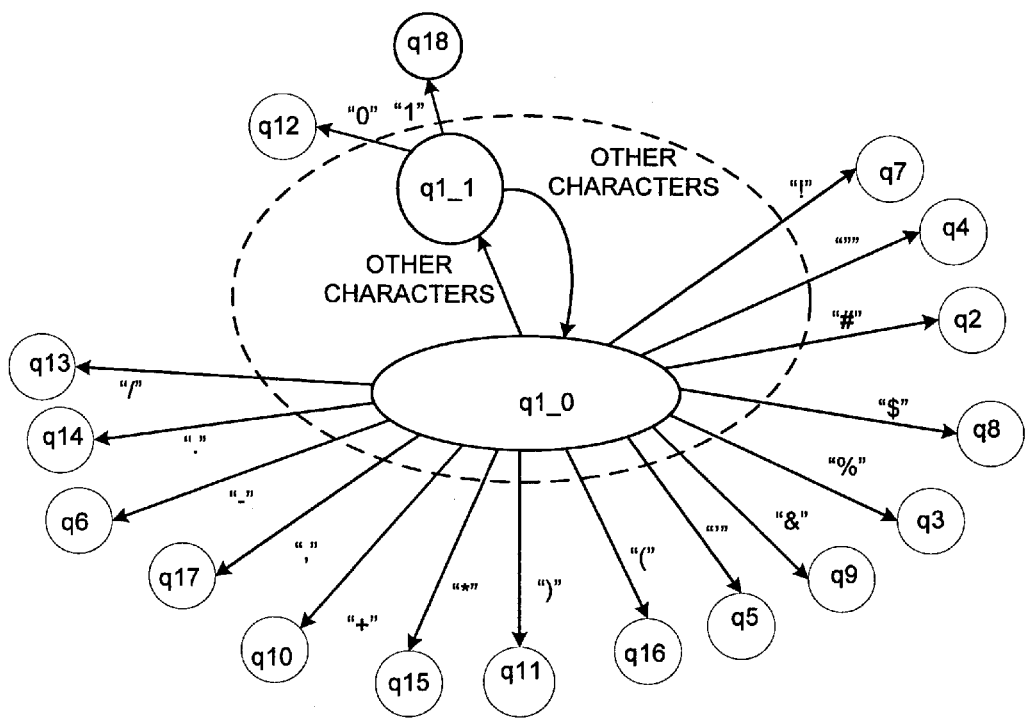
FIG. 7A illustrates an exemplary partial DFA state table associated with multiple attack signatures for which methods and systems consistent with the principles of the invention can be implemented.
FIG. 7B illustrates an exemplary state transition diagraph corresponding to compressed state information for a state defined in the DFA state table of FIG. 7A.

FIG. 7A is illustrative of an exemplary DFA transition table associated with multiple attack signatures in which a spin row includes transitions to numerous states. In one implementation, the spin row may include state transitions to more than a predetermined number of states (e.g., 16, since the compressed row may have a predetermined limit on the number entries, which may be used to define the memory address of the stored compressed row. Alternatively, a row address index table may be used, which may then require an additional access operation). In which case, the DFA table may be compressed by forming a virtual state that includes a first sub-state (e.g., q1_0) and a second sub-state (e.g., q1_1), whereby a hash value may be assigned to all entries that are included in the first sub-state, for which a state transition to the second sub-state may be defined. FIG. 7B illustrates a state transition graph that corresponds to the spin row of FIG. 7A, which includes sub-states q1_0 and q1_1. Accordingly, two compressed rows may be used for compressing state 1, e.g., q1_0 may use the original row 1 and q1_1 may use row number, n+1 (e.g., 101, (65, in hex)), where one more row is needed. For the other states which have entries to transition to original state 1 may be changed to alternatively transition to q1_0, such that q1_0 may use the same row number of original state 1 to possibly avoid the need to update the other states in the state table. Additional sub-states may be used for as many groups or portions of groups of state transitions exceed the predetermined number for any given DFA table.

FIG. 7C illustrates compressed state information for the spin row of the DFA table shown in FIG. 7A, according to one implementation consistent with the principles of the invention. As shown, the 256 entries (e.g., 512 bytes) of the spin row have been compressed to state information and split to include a set of 16 entries (0-15) and 3 entries (0-2) of state information shown in hex format and, respectively, corresponding to q1_0 and q1_1. Other distributions of the individual entries between the sub-states are possible. As shown, the spin row is compressed to state information including a first entry (0) for the state transition to state 7 for character "!" (21, in hex), a second entry (1) for the state transition to state 4 for character """ (22, in hex), and so on, and a single entry (15) for the "other" 241 spin row characters for which the next state transition either indicates that the state remains the same (i.e., state 1), or that is designated as transitioning to sub-state q1_1, which may be assigned the unassigned value, "FF" (in hex), in the extended ASCII character set, and state q1_1 as new state n+1, here, 101 (65, in hex). Sub-state q1_1 includes state information corresponding to "excess" characters "0" and "1", and shown as first (0) and second (1) entries, respectively. All "other characters" may be assigned "FF" (in hex), with a defined state transition back to sub-state q1_0, which may be assigned former state "1". The entries may also include control information (not shown).

CONCLUSION

Implementations consistent with principles of the invention provide for a hardware-based accelerator that compresses and/or prefetches and buffers state transition information for use in batch processing of IDP signature matching. Implementations may provide an intelligent caching and/or compression technique by capitalizing on the frequency with which spin state transition information is the object of memory access by a DFA search engine, to thereby advantageously decrease DFA table search time from 6-10 clock cycles to as few as 2 or fewer clock cycles. Accordingly, hardware-based accelerator systems consistent with principles of the invention provide substantially improved IDP processing over typical accelerator systems.

The foregoing description of exemplary embodiments of the invention provides illustration and description, but is not intended to be exhaustive or to limit the invention to the precise form disclosed. Modifications and variations are possible in light of the above teachings or may be acquired from practice of the invention.

For example, while a series of operations has been disclosed with regard to FIGS. 3 and 4, the order of the operations may be varied in other implementations consistent with principles of the invention. Furthermore, non-dependent operations may be implemented in parallel.

It will also be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects of the invention were described without reference to the specific software code—it being understood that one of ordinary skill in the art would be able to design software and control hardware to implement the aspects based on the description herein.

Further, certain portions of the invention may be implemented as "logic" that performs one or more functions. Such logic may include hardware, such as an application specific integrated circuit (ASIC) or a field programmable gate array, software, or a combination of hardware and software. While aspects have been described in terms of processing messages or packets, such aspects may operate upon any type or form of data, including packet data and non-packet data. The term "data unit" may refer to packet or non-packet data.

No element, operation, or instruction used in description of the present invention should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise. The scope of the invention is defined by the claims and their equivalents.

What is claimed is:

1. A method comprising:
    compressing at least one state of a finite state automaton (FSA) stored in a memory to form compressed state information, the FSA including a set of states and defined state transitions for input characters;
    storing the compressed state information, the compressed state information including individual entries for the input characters which correspond with state transitions to a next state, and a single entry for two or more characters that correspond with state transitions to a common state;
    forming a virtual state including at least two sub-states associated with the single entry when a total number of the individual entries exceeds a particular threshold number where the compressed state information comprises the virtual state;
    searching context data corresponding to a possible network attack, using the compressed state information;
    where the compressing comprises compressing a spin state; and
    wherein the spin state includes a state which is statistically most frequented by the FSA.

2. The method of claim 1, where the compressing comprises compressing a non-spin state.

3. The method of claim 1, where the compressing comprises compressing a spin state and a non-spin state.

4. The method of claim 1, where the compressing comprises compressing the at least one state by a compression factor of 8 or more.

5. The method of claim 1, where the compressing comprises compressing the at least one state from 512 bytes to at least one of 256, 128, 64, 32, or 16 bytes of compressed state information.

6. The method of claim 1, further comprising:
    defining a state transition from a first of the at least two sub-states to a second of the at least two sub-states; and
    defining a return state transition from the second of the at least two sub-states to the first of the at least two sub-states.

7. The method of claim 1, where the storing the compressed state information comprises:
    storing the compressed state information in a second memory.

8. The method of claim 7, further comprising:
    further searching the context data using non-compressed state information of the FSA by accessing the memory; and
    subsequently searching the context data using the compressed state information by accessing the second memory.

9. The method of claim 1, where the searching the context data is achieved in two or fewer clock cycles.

10. An intrusion detection system comprising:
    memory to store a finite state automaton (FSA) including a set of states and defined state transitions for input characters;
    logic to compress a designated state of the set to form compressed state information including:
    individual entries for the input characters that correspond to state transitions from the designated state to a next state,
    a single entry for input characters that correspond to a state transition from the designated state to a common state;
    a search engine to search context data corresponding to a possible network attack, using the compressed state information, where the compressed state information comprises a virtual state that includes at least two sub-states associated with the single entry when a total number of the individual entries exceeds a particular threshold number;
    where the designated state comprises a spin state; and
    wherein the spin state includes a state which is statistically most frequented by the FSA.

11. The intrusion detection system of claim 10, where the designated state comprises a non-spin state.

12. The intrusion detection system of claim 10, where the designated state comprises a second-most frequented state of the FSA.

13. The intrusion detection system of claim 10, where the common state comprises a spin state.

14. The intrusion detection system of claim 10, where the common state comprises the designated state.

15. The intrusion detection system of claim 10, where the search engine and the logic are implemented as a field-programmable gate array to communicate with the memory.

16. The intrusion detection system of claim 10, where the logic is configured to compress the state information by a compression factor of 8 or more.

17. The intrusion detection system of claim 10, where the compressed state information comprises:
    a character identifier;
    state transition information; and
    control information.

18. The intrusion detection system of claim 10, where a first sub-state includes some of the individual entries and an entry that corresponds to a state transition from the first sub-state to a second sub-state, and the second sub-state includes at least one of the individual entries and an entry that corresponds to a return state transition from the second sub-state to the first sub-state.

19. The intrusion detection system of claim 18, where the first sub-state comprises a total number of entries that is equal to one more than the particular threshold number.

20. The intrusion detection system of claim 18, where the first sub-state is assigned a state address of the designated state, and the second sub-state is assigned a state address equal to one more than a total number of states in the set.

21. The intrusion detection system of claim 10, where the compressed state information comprises content addressable memory data.

22. The intrusion detection system of claim 10, further comprising:
    a second memory to store the compressed state information.

23. The intrusion detection system of claim 22, where the search engine is configured to search the context data using non-compressed state information of the FSA by accessing the memory and using the compressed state information by accessing the second memory.

24. An intrusion detection system comprising:
    means for compressing state information of a finite state automaton state table, where the state information includes a set of states that relate to a set of values;
    means for storing the compressed state information as content addressable memory data, where the compressed state information includes individual entries for the values having a corresponding state transition to a non-spin state, and includes a single entry for the values having a corresponding state transition to a common state;
    means for searching context data corresponding to a possible network attack, using the compressed state information;
    where the state information comprises a spin row; and
    where the spin row comprises a row including at least one of a state that is frequented most often by the means for searching context data or a state to which other states transition for a plurality of entries in a single row of the finite state automation state table.

25. The intrusion detection system of claim 24, where the spin row comprises a row including at least one of a state in which the means for searching context data begins the searching the context data or a state in which an intrastate transition occurs.

* * * * *

UNITED STATES PATENT AND TRADEMARK OFFICE
CERTIFICATE OF CORRECTION

PATENT NO. : 7,661,138 B1  Page 1 of 1
APPLICATION NO. : 11/214896
DATED : February 9, 2010
INVENTOR(S) : Xianzhi Li It is certified that error appears in the above-identified patent and that said Letters Patent is hereby corrected as shown below:

On the cover page (73) Assignee should spell: Juniper Networks, Inc., Sunnyvale, CA (US).

Column 10, lines 47-50 read: "5. The method of claim 1, where the compressing comprises compressing the at least one state from 512 bytes to at least one of 256, 128, 64, 32, or 16 bytes of compressed state information." which should read: "5. The method of claim 1, where the compressing comprises compressing the at least one state from 512 bytes to one of 256, 128, 64, 32, or 16 bytes of compressed state information."

Signed and Sealed this

Sixth Day of April, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,661,138 B1 | Page 1 of 1 |
| APPLICATION NO. | : 11/214896 | |
| DATED | : February 9, 2010 | |
| INVENTOR(S) | : Xianzhi Li | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1,031 days.

Signed and Sealed this

Twenty-third Day of November, 2010

David J. Kappos
*Director of the United States Patent and Trademark Office*